United States Patent
Koto

(10) Patent No.: US 8,422,613 B2
(45) Date of Patent: Apr. 16, 2013

(54) CLOCK-SYNCHRONOUS COMMUNICATION APPARATUS AND COMMUNICATION SYSTEM

(75) Inventor: Kazuhiro Koto, Kariya (JP)

(73) Assignee: DENSO CORPORATION, Kariya (JP)

( * ) Notice: Subject to any disclaimer, the term of this patent is extended or adjusted under 35 U.S.C. 154(b) by 634 days.

(21) Appl. No.: 12/570,529

(22) Filed: Sep. 30, 2009

(65) Prior Publication Data

US 2010/0080332 A1 Apr. 1, 2010

(30) Foreign Application Priority Data

Sep. 30, 2008 (JP) .................................. 2008-253770

(51) Int. Cl.
*H04L 7/00* (2006.01)
(52) U.S. Cl.
USPC .......................................... 375/354; 375/220
(58) Field of Classification Search .......... 375/354–358, 375/219–221
See application file for complete search history.

(56) References Cited

U.S. PATENT DOCUMENTS

| | | | | |
|---|---|---|---|---|
| 4,847,867 A * | 7/1989 | Nasu et al. | ..................... | 375/257 |
| 4,984,190 A * | 1/1991 | Katori et al. | .................. | 709/237 |
| 6,647,506 B1 * | 11/2003 | Yang et al. | ..................... | 713/503 |
| 6,950,956 B2 * | 9/2005 | Zerbe et al. | .................... | 713/400 |
| 7,107,810 B2 * | 9/2006 | McClung | .......................... | 72/348 |
| 7,643,593 B1 * | 1/2010 | Macomber | .................... | 375/355 |
| 2001/0026374 A1 | 10/2001 | Tominaga | | |
| 2004/0232967 A1 | 11/2004 | Ishimi | | |
| 2006/0006909 A1 | 1/2006 | Morigaki | | |
| 2007/0127086 A1 | 6/2007 | Tominaga | | |
| 2007/0216462 A1 | 9/2007 | Ishimi | | |
| 2007/0291887 A1 | 12/2007 | Ishimoto | | |
| 2010/0146172 A1* | 6/2010 | Sidiropoulos | ................. | 710/107 |

FOREIGN PATENT DOCUMENTS

| | | |
|---|---|---|
| JP | 10-210018 | 8/1998 |
| JP | 11-003135 | 1/1999 |
| JP | 11-239193 | 8/1999 |
| JP | 11-252060 | 9/1999 |
| JP | 11-355382 | 12/1999 |
| JP | 2001-318882 | 11/2001 |
| JP | 2004-282330 | 10/2004 |
| JP | 2004-348573 | 12/2004 |
| JP | 2006-033032 | 2/2006 |
| JP | 2007-324679 | 12/2007 |

OTHER PUBLICATIONS

Japanese Office Action dated Sep. 7, 2010 for corresponding Japanese Application No. 2008-253770 with English Translation.

* cited by examiner

*Primary Examiner* — Emmanuel Bayard
(74) *Attorney, Agent, or Firm* — Nixon & Vanderhye P.C.

(57) ABSTRACT

In a clock-synchronous communication system, a clock pulse as a communication clock is outputted from a master device to a slave device so as to synchronize the master device and slave device. The transmitting side transmits a data to a data line with a first edge timing of the clock pulse, and the receiving side receives the data from the data line with a second edge timing of the clock pulse. A microcomputer as the master device is configured to enable separate setting of high-level duration and low-level duration of a clock pulse to be outputted, using a program. High-level duration and low-level duration are each set to a minimum value that satisfies the requirements for constituting communication with a communication destination. Uprating not only the cycle of a clock pulse but also the communication baud rate, efficient clock-synchronous communication can be performed.

2 Claims, 14 Drawing Sheets

|  | MASTER | SLAVE |
|---|---|---|
| OUTPUT DELAY TIME | tA (50 μs) | ta (100 μs) |
| DATA SETUP TIME | tB (30 μs) | tb (150 μs) |
| DATA HOLD TIME | tC (40 μs) | tc (100 μs) |

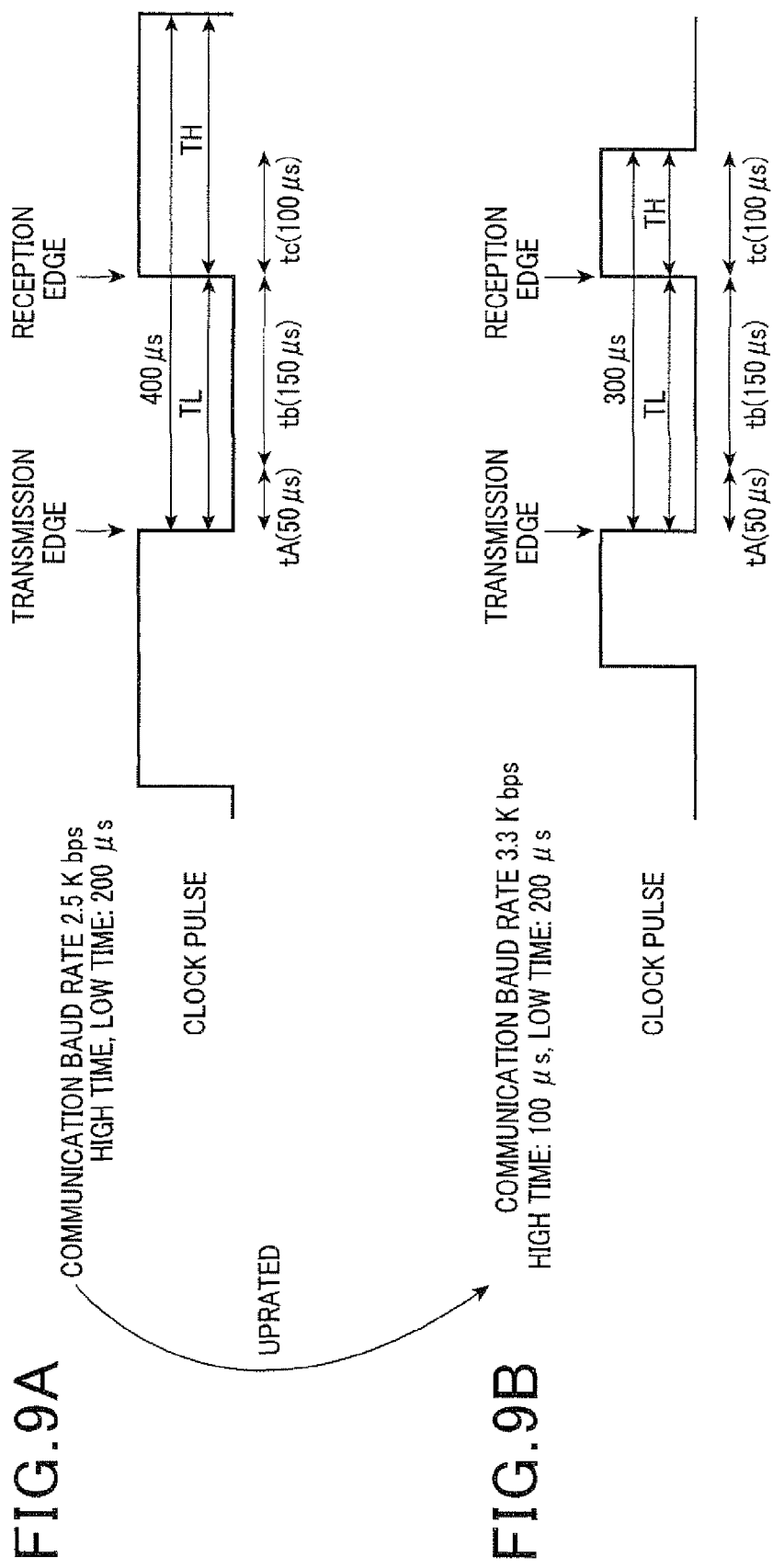

CLOCK-SYNCHRONOUS COMMUNICATION APPARATUS AND COMMUNICATION SYSTEM

CROSS-REFERENCE TO RELATED APPLICATION

This application is based on and claims the benefit of priority from earlier Japanese Patent Application No. 2008-253770 filed Sep. 30, 2008, the description of which is incorporated herein by reference.

BACKGROUND OF THE INVENTION

1. Field of the Invention

The present invention relates to clock-synchronous communication apparatus which receives/transmits data synchronized with a clock signal and a communication system equipped therewith, and in particular, to a clock communication apparatus and a communication system, which is suitable for configuring a communication system consisting of master/slave devices as a plurality of communication apparatus.

2. Description of Related Art

Conventionally, various methods have been adapted to communication performed among a plurality of communication apparatus. One of these methods has been used in a clock-synchronous communication system as follows.

In the clock-synchronous communication system, a communication clock is outputted from a master device to a slave device through a clock line. Of the master device and the slave device, the one which transmits data performs an operation of transmitting a data signal to the data line with a first (i.e., either one of rising or falling) edge timing of a communication clock, and the one which receives data performs an operation of receiving the data signal from the data line with a second edge timing (i.e., the other of rising or falling) of the communication clock.

In such a clock-synchronous communication system, a communication baud rate is determined, taking into account the output delay time of data signal on the transmission side, and data setup time and data hold time on the reception side. Details will be described hereinbelow.

Data setup time refers to a minimum time during which a transmission side has to define a data signal on the data line, preceding the above-mentioned second edge timing of a communication clock, so that the data signal can be reliably inputted to the reception side. Also, data setup time depends on the characteristics of the reception side. In other words, data setup time indicates how much earlier the data signal on the data line has to be defined, than the second edge timing when the reception side starts the reception operation.

Data hold time refers to a minimum time during which the transmission side has to continue outputting of the data signal to the data line even after the occurrence of the second edge timing in the communication clock, in order to reliably input the data signal to the reception side. In other words, data hold time indicates how long the data signal on the data line has to be kept being held after the second edge timing when the reception side starts the reception operation. Data hold time also depends on the characteristics of the reception side.

Output delay time of data signal refers to a time from when the transmission side starts the operation of outputting a data signal to the data line with the first edge timing, up to when the actual voltage on the data line reaches the voltage valid for the outputted data signal. Output delay time of data signal depends on the signal output characteristics of the transmission side (characteristics of the transmission circuit), the capacity of the data line, and the like.

As shown in FIG. 1, a master device in a clock-synchronous communication system has been configured in such a way that the high-level duration (high time) and the low-level duration (low time) will be the same in a communication clock outputted to a slave device. Therefore, high time and low time in a communication clock will change at an interval corresponding to half of the communication baud rate cycle (i.e., inverse number of the communication baud rate).

Thus, the communication baud rate in a conventional clock-synchronous communication system has been determined, as shown in FIG. 1, so that an interval corresponding to half of a communication baud rate cycle T (=T/2: half cycle of a communication clock) satisfies the following two requirements (1) and (2).

(1) T/2≧"output delay time of data signal+data setup time"
(2) T/2≧"data hold time"

It should be appreciated that, in the example shown in FIG. 1, of the edges of the communication clock, the falling edge corresponds to the first edge mentioned above, i.e., an edge of transmission operation start timing (hereinafter also referred to as a "transmission edge"), and the rising edge corresponds to the second edge mentioned above, i.e., an edge of reception operation start timing (hereinafter also referred to as a "reception edge").

In the case where only one-way communication is performed from a master device to a slave device, the output delay time of the master device on the transmission side, and the data setup time and the data hold time of the slave device on the reception side are applied to the two requirements (1) and (2). Meanwhile, in the case where two-way communication is performed between a master device and a slave device, either "output delay time of master slave+data setup time of slave device" or "output delay time of slave device+data setup time of master device", whichever is longer, is used as the "output delay time+data setup time" in the requirement (1). Also, in this case, either "data hold time of slave device" or "data hold time of master device", whichever is longer, is used as the "data hold time" in the requirement (2).

Data setup time is also simply referred to as "setup time". Similarly, data hold time is also simply referred to as "hold time". Such setup time and hold time are described, for example, in Japanese Patent Application Laid Open Publication No. 11-252060.

If there are no limiting factors, such as the necessity of having noise-tolerance properties, it is desirable that a communication baud rate is set to as large a value as possible. This is because, with a communication baud rate of a larger value, the amount of data to be transmitted during a certain time can be more increased, compared with the case where there are limiting factors.

However, with the conventional technique, the above requirements (1) and (2) have been required to be satisfied by the interval corresponding to half of a communication baud rate cycle. Therefore, when the time taken from a transmission edge to a reception edge in a communication clock (=output delay time+data setup time) is considerably different from the time taken from the reception edge to the transmission edge (=data hold time), as in the example shown in FIG. 1, the communication baud rate will have to be set in conformity with the longer one of the above times.

For example, in the example shown in FIG. 1, the "data hold time on reception side" is shorter than the "output delay time on transmission side+data setup time on reception side". Therefore, the time taken from the reception edge to the transmission edge in the communication clock may be shorter than the time taken from the transmission edge to the reception edge. However, with the conventional technique, the time taken from the reception edge to the transmission edge has been set to the same as the time taken from the transmission edge to the reception edge. Due to such redundant time (i.e., due to the time indicated as "vacant time" in FIG. 1), it has been problematically difficult to uprate the communication baud rate.

SUMMARY OF THE INVENTION

The present invention has as its object to raise a communication baud rate in order to perform efficient clock-synchronous communication.

A communication apparatus according to a first aspect for resolving the above problem is used as a master device in a clock-synchronous communication system. In the clock-synchronous communication system, a communication clock is outputted from the master device to a slave device through a clock line. Meanwhile, of the master device and the slave device, the transmitting side transmits a data signal to the data line with a first edge timing of the communication clock, and the receiving side receives the data signal from the data line with a second edge timing of the communication clock.

In particular, the communication apparatus is provided with time setting means that enables separate setting of high time and low time of a communication clock (i.e., high and low level duration) to be outputted to the slave device.

The time setting means is not limited to one which is able to directly set each of high time and low time of a communication clock. Alternatively, for example, the time setting means may be one which is able to set the cycle of a communication cock, as well as either one of high time and low time of the communication clock. This is because change of cycle can change the other one of high time and low time.

According to such a communication apparatus, high time and low time of a communication clock can be set to a different time by the time setting means.

Accordingly, the "vacant time" indicated in FIG. 1 discussed above can be eliminated, and thus the communication baud rate of the clock-synchronous communication system can be uprated so as to perform efficient communication (so as to shorten the time taken for the communication). In other words, each of high time and low time of a communication clock can be set to a minimum time that satisfies the to requirements for communication.

To explain in detail, the time from a transmission edge (the first edge mentioned above) to a reception edge (the second edge mentioned above) of a communication clock is designated with T1, and the time from the reception edge to the transmission edge of the communication clock is designated with T2. When the transmission edge is a falling edge (reception edge is a rising edge), time T1 is low time and time T2 is high time. Conversely, when the transmission edge is a rising edge (reception edge is a falling edge), time T1 is high time and time T2 is low time.

Times T1 and T2 may be set so that the following two requirements (a) and (b), respectively, for constituting communication can be satisfied:

(a) T1≧"output delay time of transmission side+data setup time of reception side"

(b) T2≧"data hold time of reception side"

In the case where only one-way communication is performed from the communication apparatus as a master device to a slave device, the transmission side in the above two requirements (a) and (b) corresponds to the communication apparatus and the reception side corresponds to the slave device as a communication destination. On the other hand, in the case where only one-way communication is performed from the slave device to the communication apparatus, the transmission side in the above two requirements (a) and (b) corresponds to the slave device and the reception side corresponds to the communication apparatus.

In the case where two-way communication is performed between the communication apparatus and a slave device, either "output delay time of the communication apparatus+ data setup time of a slave device as communication destination" or "output delay time of a slave device as communication destination+data setup time of the communication apparatus", whichever is longer, is used as the "output delay time of transmission side+data setup time of reception side" in the above requirement (a). Also, in this case, either "data hold time of a slave device as a communication destination" or "data hold time of the communication apparatus", whichever is longer, is used as the "data hold time of reception side" in the above requirement (b).

A communication apparatus according to a second aspect is different from the communication apparatus of the first aspect in that the apparatus of the second aspect is adapted to communicate with a plurality of slave devices, and to switch high time and low time of a communication clock for each slave device as a communication destination, using time setting means.

Specifically, since the times on the right-hand sides of the above requirements (a) and (b) are different depending on the communication destination, high time and low time of the communication clock is ensured to be switched according to the communication destination so that the two requirements (a) and (b) are satisfied. Thus, communication baud rate can be changed so as to be suitable for the communication destination concerned, whereby communication can be performed as quickly as possible with the communication destination concerned.

A communication apparatus according to a third aspect is different from the communication apparatuses of the first and second aspects in that, the apparatus of the third aspect is adapted to switch high time and low time of a communication clock, between the case where a data signal is transmitted to a slave device and the case where the data signal is received from the slave device, using time setting means.

With this configuration, the two requirements (a) and (b) only have to be satisfied during limited times, i.e., the time of performing transmission to a slave device and the time of performing reception from the slave device. Therefore, it is possible to obtain a communication baud rate enabling much faster communication.

To explain in detail, in performing transmission to a slave device, times T1 and T2 of a communication clock only have to be set so that the two requirements (a) and (b) are satisfied under the conditions where the communication apparatus serves as the transmission side and a slave device serves as the reception side. On the other hand, in performing reception from the slave device, times T1 and T2 of a communication clock only have to be set so that the two requirements (a) and (b) are satisfied under the conditions where the slave device serves as the transmission side and the communication apparatus serves as the reception side.

A communication apparatus according to a fourth aspect is also used as a master device in a clock synchronous communication system. In the communication apparatus of the fourth aspect, time T2 from the second edge timing to the first edge timing in a communication clock to be outputted to a slave device is set shorter than time T1 from the first edge timing to the second edge timing (i.e., T1>T2).

Specifically, while time T1 in a communication clock should be ensured to last for a time equal to or longer than the "output delay time+data setup time", the other time T2 may only have to last for a time equal to or longer than the "data hold time". Although it has been generally acknowledged that data setup time substantially equals to data hold time, i.e., "T1=T2", setting the times as in the fourth aspect may make the cycle of a communication clock shorter than in a conventional apparatus. Accordingly, it is possible to obtain a communication baud rate with which fast communication can be performed.

A fifth aspect of the present invention is a communication system equipped with communication apparatus from the first aspect to the fourth aspect of and the slave device which is capable of performing clock-synchronous communication with the communication apparatus. With this configuration, it is possible to obtain a higher communication baud rate than in the past.

BRIEF DESCRIPTION OF THE DRAWINGS

In the accompanying drawings:

FIGS. 9A and 9B are an explanatory view illustrating the effect exerted by the first embodiment;

DETAILED DESCRIPTION OF THE PREFERRED EMBODIMENTS

With reference to FIGS. 2 to 16, hereinafter are described some embodiments of a clock-synchronous communication system of the present invention.

[First Embodiment]

With reference to FIGS. 2 to 9, hereinafter will be described a clock-synchronous communication system according to a first embodiment of the present invention.

Figure 1:
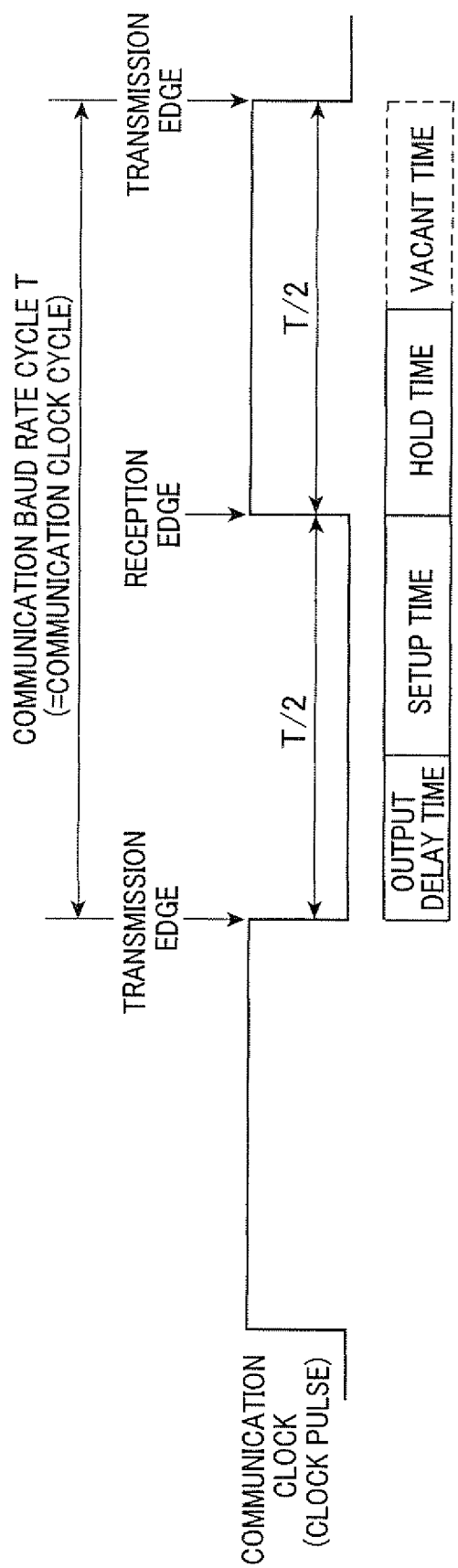
FIG. 1 is an explanatory view of a conventional technique.
Figure 2:
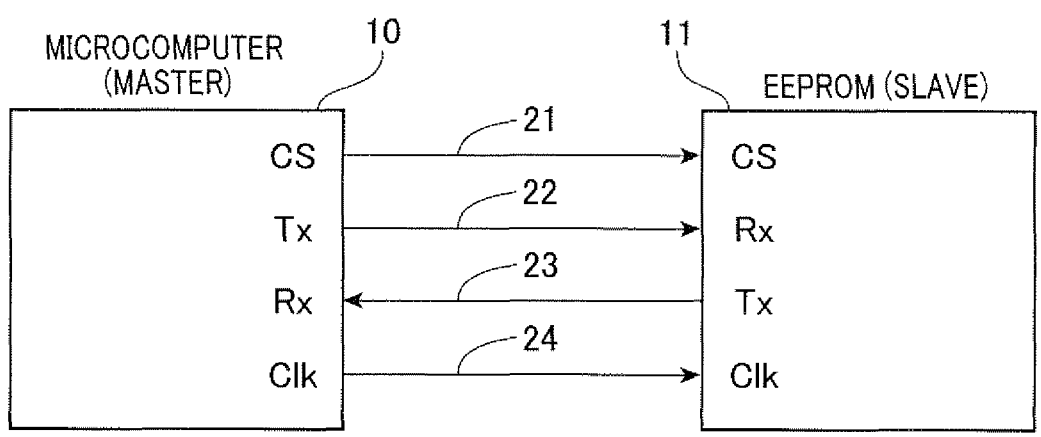
FIG. 2 is a block diagram illustrating a clock-synchronous communication system according to a first embodiment of the present invention.

As shown in FIG. 2, a clock-synchronous communication system according to a first embodiment includes a microcomputer (corresponding to the communication apparatus) 10 as a master device, and an EEPROM (electrically erasable programmable ROM) 11 as a slave device. The microcomputer 10 and the EEPROM 11 are connected to each other through a chip select line 21, two data lines 22, 23, and a clock line 24. Accordingly, the microcomputer 10 as the master device and the EEPROM 11 as the slave device perform a master/slave type of communication (master/slave communication) in the clock-synchronous communication system.

The chip select line 21 is a signal line that passes a chip select signal which is outputted when the microcomputer 10 selects the EEPROM 11 as a communication destination. It should be appreciated that the chip select signal is low active in the present embodiment.

The data line 22 is a transmission line through which a data signal is outputted from the microcomputer 10 to a slave device. The data line 23 is a reception line through which the microcomputer 10 receives a data signal from a slave device.

The clock line 24 is a signal line through which a communication clock for synchronization is outputted from the microcomputer 10 to a slave device.

In the following description, the term "communication clock" will be referred to as a "clock pulse". In FIG. 2, indicated by CS is an output terminal or an input terminal for chip select signals, by Tx is a data signal output terminal, by Rx is a data signal input terminal, and by Clk is an output terminal or an input terminal of clock pulses. Thus, the terminal CS of the microcomputer 10 and the terminal CS of the EEPROM 11 are connected with each other through the chip select line 21; the terminal Tx of the microcomputer 10 and the terminal Rx of the EEPROM 11 are connected with each other through the data line 22; the terminal Rx of the microcomputer 10 and the terminal Tx of the EEPROM 11 are connected with each other through the data line 23; and the terminal Clk of the microcomputer 10 and the terminal Clk of the EEPROM 11 are connected with each other through the clock line 24.

Figure 3:
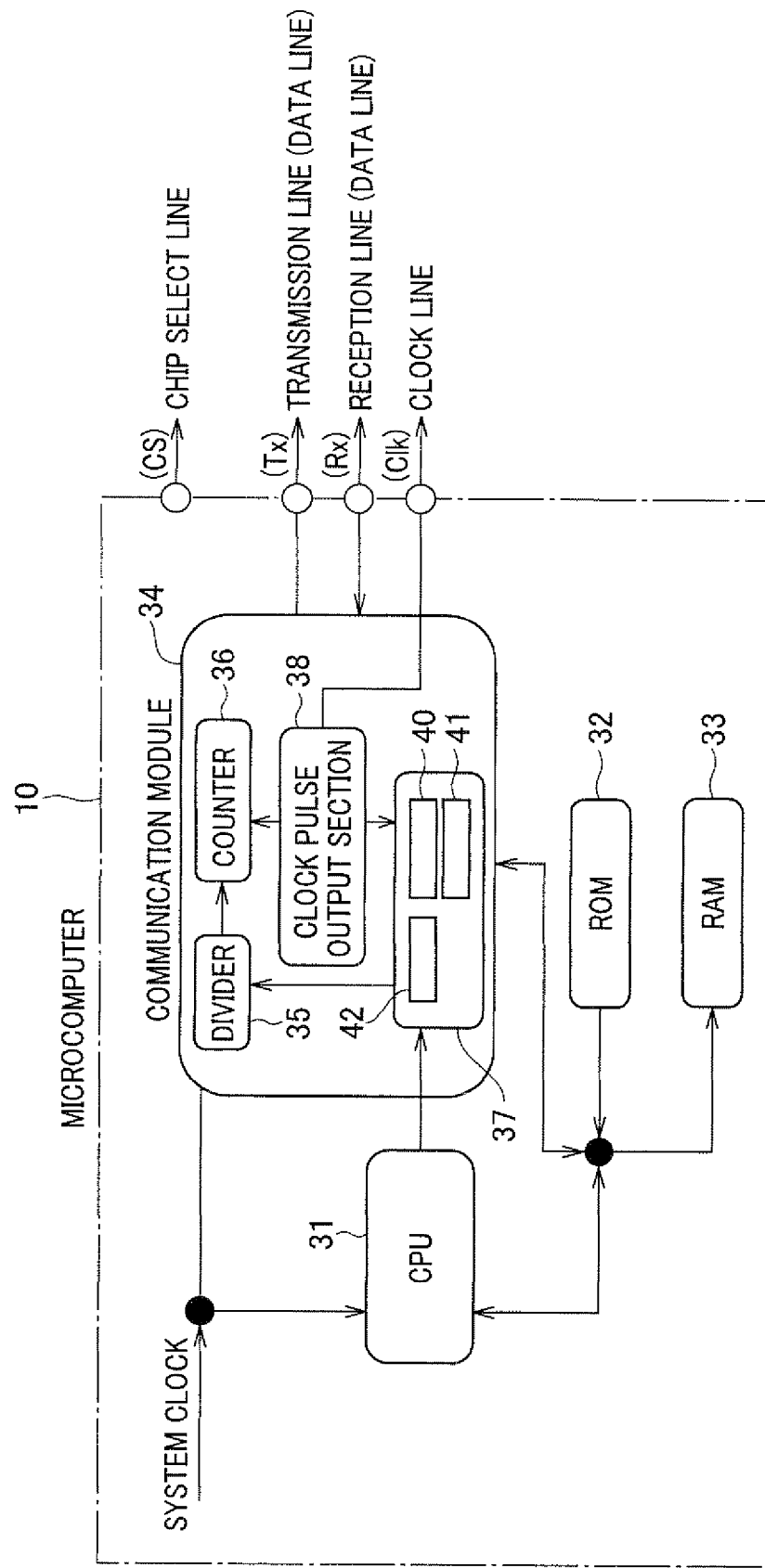
FIG. 3 is a block diagram illustrating a microcomputer as a master device.

As shown in FIG. 3, the microcomputer 10 includes a CPU 31 that executes a program, a ROM 32 that stores the program, a RAM 33 that stores results of computation performed by the CPU 31, and a communication module 34 that communicates with a slave device.

The communication module 34 includes means for producing and outputting clock pulses, a divider 35, a counter 36, a group of registers 37 and a clock pulse output section 38.

The group of registers 37 includes a low time register 40 to is which a value indicative of low-level duration (low time) of a clock pulse is set by the CPU 31, a high time register 41 to which a value indicative of high-level duration (high time) of a clock pulse is set by the CPU 31, and a dividing value register 42 to which a frequency dividing value for system clocks, i.e., operation clocks, of the microcomputer 10 is set by the CPU 31. For example, a system clock is produced by shaping and dividing, in the microcomputer 10, an oscillation signal issued from an oscillator (not shown) made of crystal, or the like.

The divider 35 divides a system clock using a frequency dividing value set to the dividing value register 42. The counter 36 increments count with the clock after being divided by the divider 35 (hereinafter referred to as a "divided clock").

The clock pulse output section 38 inverts the output level of the clock pulses from "low" to "high" when the value of the counter 36 has matched the value of the low time register 40, while resetting the value of the counter 36 to "0". After that, when the value of the counter 36 has matched the value of the high time register 41, the clock pulse output section 38 inverses the output level of the clock pulse from "high" to "low", while resetting the value of the counter 36 to "0". These operations are repeatedly performed.

Accordingly, the low time of a clock pulse will be equal to "one cycle of a divided clock×value of the low time register 40", while the high time of a clock pulse will be equal to "one cycle of a divided clock×value of the high time register 41". If the high time and low time of a clock pulse are rendered to be variable according to the resolution for one cycle of a system clock, the divider 35 may not be provided.

Figure 4:
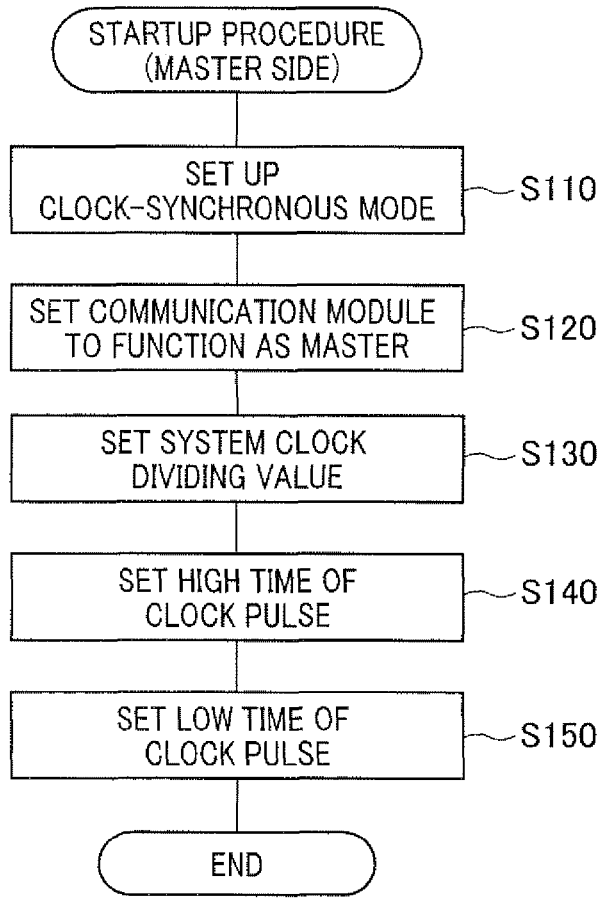
FIG. 4 is a flow diagram illustrating a startup procedure performed by the microcomputer.
Figure 5:
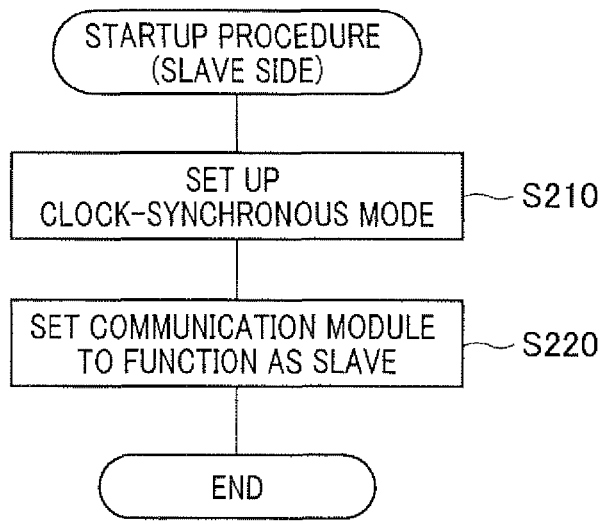
FIG. 5 is a flow diagram illustrating a startup procedure performed by an EEPROM (electrically erasable programmable ROM)
Figure 6:
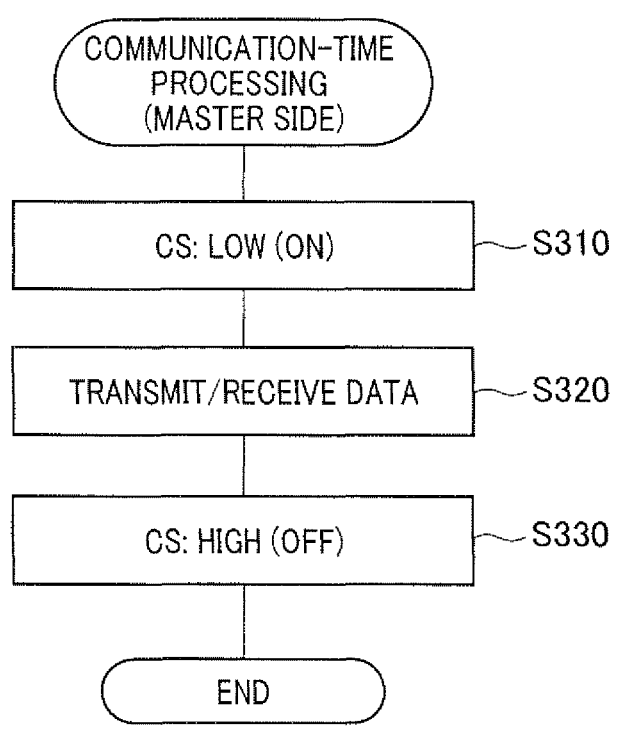
FIG. 6 is a flow diagram illustrating a communication-time processing performed by the microcomputer.

Referring now to FIGS. 4 to 6, hereinafter will be described the contents of the processes performed for communication by the microcomputer 10 and the EEPROM 11.

FIG. 4 is a flow diagram illustrating a startup procedure performed by the microcomputer 10. It should be appreciated that the is processing performed by the microcomputer is actually performed by the CPU 31.

As shown in FIG. 4, being started up in the initial state, the microcomputer 10 sets, at step S110, the communication operation mode of the communication module 34, first, to a clock-synchronous mode of performing clock-synchronous communication, from among the clock-synchronous mode and modes of performing communication based on other types of communication (e.g. UART: universal asynchronous receiver transmitter). Then, at the subsequent step S120, the microcomputer 10 sets the operation mode in the clock-synchronous mode of the communication module 34 to an operation mode that enables functioning as a master device.

Then, at step S130, a frequency dividing value of a system clock is set. In particular, a frequency dividing value is set in the dividing register 42.

After that, at the subsequent step S140, the high time of a clock pulse is set, and then, at the subsequent step S150, the low time of a clock pulse is set. In particular, a value indicative of high time is written to the high time register 41, and a value indicative of low time is written to the low time register 40. After that, the startup procedure is ended.

A detailed description will be provided later as to the timeframes set for the high time and low time of a clock pulse at the above steps S140 and S150.

FIG. 5 is a flow diagram illustrating a startup procedure performed by the EEPROM 11.

As shown in FIG. 5, upon startup of the EEPROM 11, the communication operation mode of EEPROM is set, first, at step S210, to a clock-synchronous mode of performing clock-synchronous communication, from among the clock-synchronous mode and modes of performing communication based on other types of communication (e.g. UART). Then, at step S220, the operation mode of the EEPROM 11 in the clock-synchronous mode is set to an operation mode that enables functioning as a slave device. After that, the startup procedure is ended.

It should be appreciated that if the EEPROM 11 has a configuration that cannot be anything but a slave device of the clock-synchronous communication system, then the process shown in FIG. 5 is not necessary.

When communication timing has come to make communication with the EEPROM 11, the microcomputer 10 performs a communication-time processing shown in FIG. 6. For example, the communication timing may be the timing that occurs regularly, or may be the timing when a particular event occurs.

As shown in FIG. 6, in the communication-time processing, the chip select signal (CS) to be transmitted to the EEPROM 11 is allowed to be "low", first, at step S310, to bring the EEPROM 11 into a communicable state. Then, at the subsequent step S320, transmission/reception of data is performed to/from the EEPROM 11. Then, after completely finishing transmission/reception data to/from the EEPROM 11, the chip select signal (CS) to be transmitted to the EEPROM 11 is allowed to be "high" again instead of "low", at step S330, whereby the communication-time processing is ended.

Figure 7:
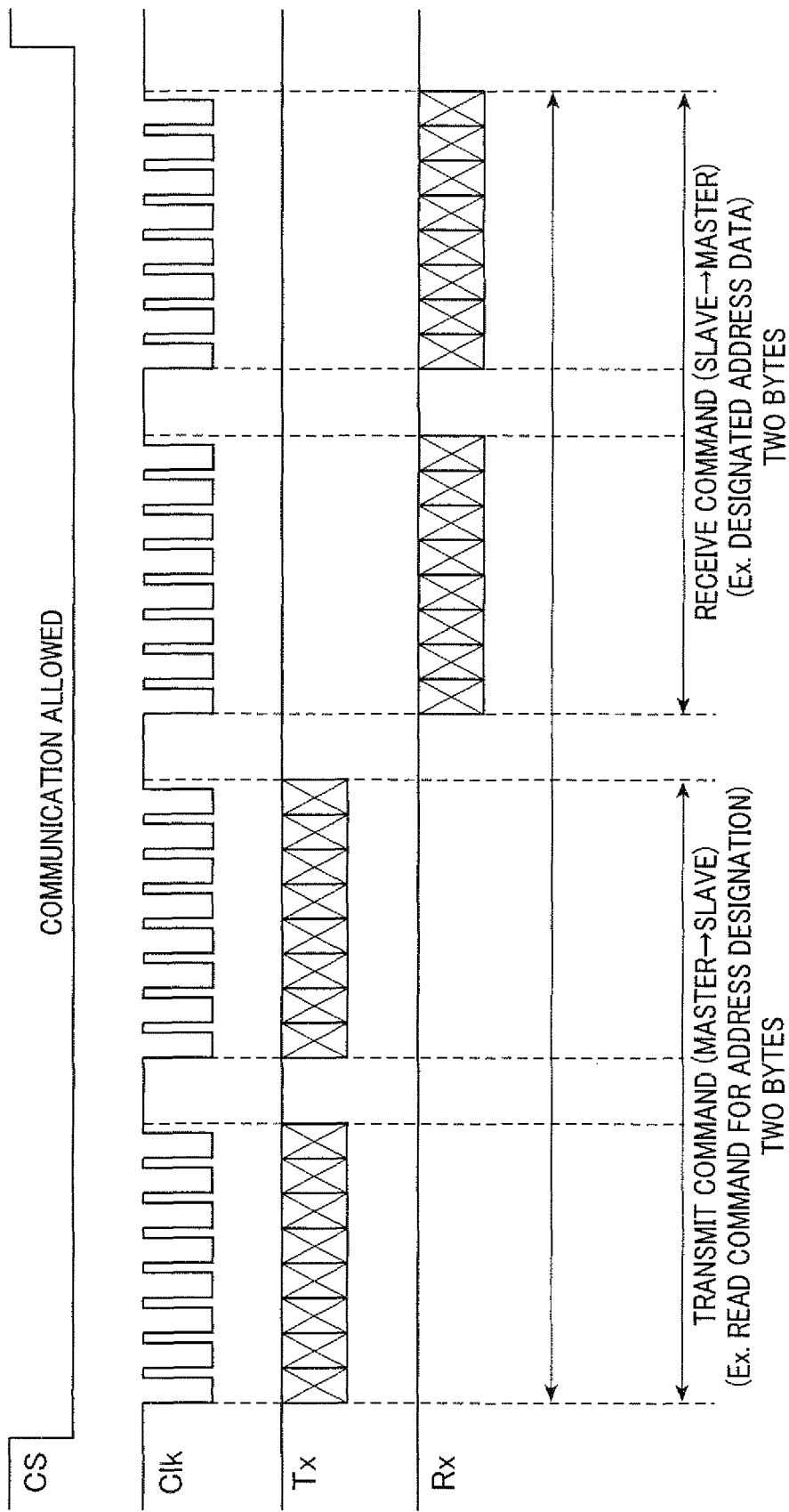
FIG. 7 is a timing diagram illustrating data transmission/reception performed between the microcomputer and the EEPROM.

In the present embodiment, data transmission/reception between the microcomputer 10 and the EPROM 11 is performed as shown in FIG. 7.

Specifically, a read command (two bytes in this example) is transmitted, first, from the microcomputer 10 to the EEPROM 11 to designate a read data address. In this case, the microcomputer 10 is on the transmission side and the EEPROM 11 is on the reception side.

Then, the EPROM 11 that has received the read command from the microcomputer 10 transmits the data (two bytes in this example) of the address designated by the read command to the microcomputer 10. In this case, the EEPROM 11 is on the transmission side and the microcomputer 10 is on the reception side.

In either of the case of performing transmission from the microcomputer 10 to the EPROM 11 and the case of performing transmission from the EEPROM 11 to the microcomputer 10, the transmission side performs an operation of transmitting a data signal to the data line (22 or 23) with the timing when a first edge (falling edge in the present embodiment) has occurred in the clock pulse, and the reception side performs an operation of receiving a data signal from the data line (22 or 23) with the timing when a second edge (rising edge in the present embodiment) has occurred in the clock pulse.

Such data transmission/reception operation in the microcomputer 10 is usually performed by the communication module 34. In FIG. 7, the terminals CS, Clk, Tx and Rx are all the terminals on the side of the microcomputer 10. The waveforms associated with these terminals indicate sequentially, from the top of the figure, the waveforms associated with the chip select line 21, the clock line 24, the data line 22 and the data line 23.

Hereinafter is described as to what timeframes are set by the microcomputer 10 for high time and low time of a clock pulse, at the steps S140 and S150 of FIG. 4 described above.

Figures 8A, 8B:
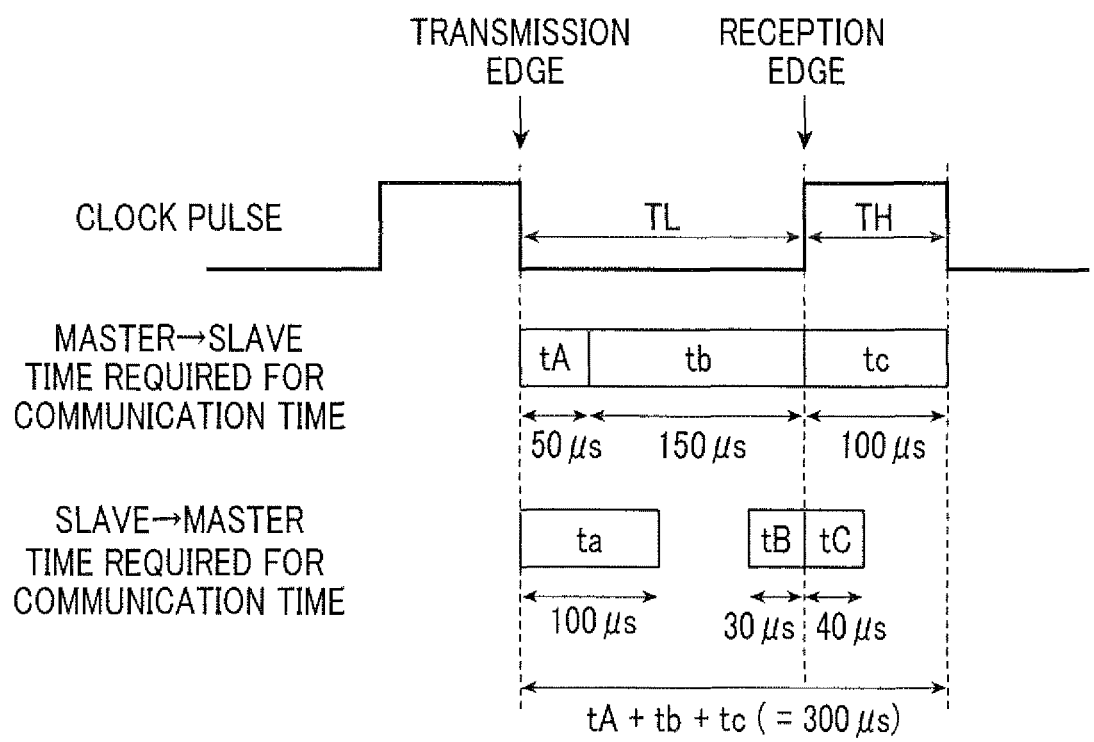
FIGS. 8A and 8B are explanatory views illustrating timeframes set for high time and low time of a clock pulse (communication clock)

In the present embodiment, the output delay time, the data setup time and the data hold time of each of the microcomputer 10 and the EEPROM 11 are rendered to have values as shown in FIG. 8A. It should be appreciated that, in FIGS. 8A and 8B, the term "master" refers to the microcomputer 10, and the term "slave" refers to the EEPROM 11. As shown in FIG. 8B, of the edges of the clock pulse, the falling edge corresponds to a transmission edge of transmission operation start timing, and the rising edge corresponds to a reception edge of reception operation start timing.

Thus, considering the transmission from the microcomputer 10 to the EEPROM 11 based on the two requirements (a) and (b) discussed above, low time TL and high time TH of a clock pulse are required to satisfy the following Formulas (1) and (2) (see the second stage of FIG. 8B):

$$TL \geq (tA+tb)=(50\ \mu s+150\ \mu s)=200\ \mu s \tag{1}$$

$$TH \geq tc=100\ \mu s \tag{2}$$

where tA is the output delay time of the microcomputer 10, tb is the data setup time of the EEPROM 11 and tc is the data hold time of the EEPROM 11.

On the other hand, considering the transmission from the EEPROM 11 to the microcomputer 10, the low time TL and the high time TH of a clock pulse are required to satisfy the following Formulas (3) and (4) (see the third stage of FIG. 8B):

$$TL \geq (ta+tB) = (100 \text{ }\mu s + 30 \text{ }\mu s) = 130 \text{ }\mu s \quad (3)$$

$$TH \geq tC = 40 \text{ }\mu s \quad (4)$$

where to is the output delay time of the EEPROM 11, tB is the data setup time of the microcomputer 10 and tC is the data hold time of the microcomputer 10.

Accordingly, the low time TL and the high time TH may be set so as to satisfy all of the above four Formulas (1), (2), (3) and (4). In this example, satisfying Formula (1) means satisfying Formula (3) as well, and satisfying Formula (2) means satisfying Formula (4) as well.

In this regard, as shown in FIG. 8B, the microcomputer 10 sets the low time TL, at the steps S140 and S150 of FIG. 4, to 200 µs which is the minimum value satisfying both of Formulas (1) and (3), and sets the high time TH to 100 µs which is the minimum value satisfying both of Formulas (2) and (4).

Accordingly, the cycle of the clock pulse (=TL+TH) will be 300 µs, rendering the communication baud rate to be about 3.3 K bps (see FIG. 9B). In the present embodiment, since "one modulation/demodulation=one bit of data" and "baud rate=bit per second (bps)" are established, "bps" is used as a unit of the baud rate.

If there is no other way but to set the high time TH and the low time TL of a clock pulse to the same value, the high time TH cannot be any value but 200 µs, as shown in FIG. 9A, as that of the low time TL. In this case, the cycle of the clock pulse (=TL+TH) will be 400 µs, unavoidably reducing the communication baud rate to be 2.5 K bps.

In this regard, according to the microcomputer 10 of the present embodiment, the high time TH and the low time TL of a clock pulse can be separately set using a program. Therefore, the cycle of the clock so pulse can be shortened to perform efficient communication. Specifically, as shown in FIGS. 8B and 9B, it is possible to set, in a clock pulse, the high time TH so as to be shorter than the low time IL which starts from the transmission edge and ends at the reception edge.

In this way, according to the microcomputer 10 of the present embodiment, the communication baud rate of the clock-synchronous communication system can be uprated so as to perform efficient communication (so as to shorten the time taken for communication).

In the present embodiment, the counter 36, the low and high time registers 40 and 41, and the clock pulse output section 38 correspond to the time setting means.

[Second Embodiment]

Figure 10:
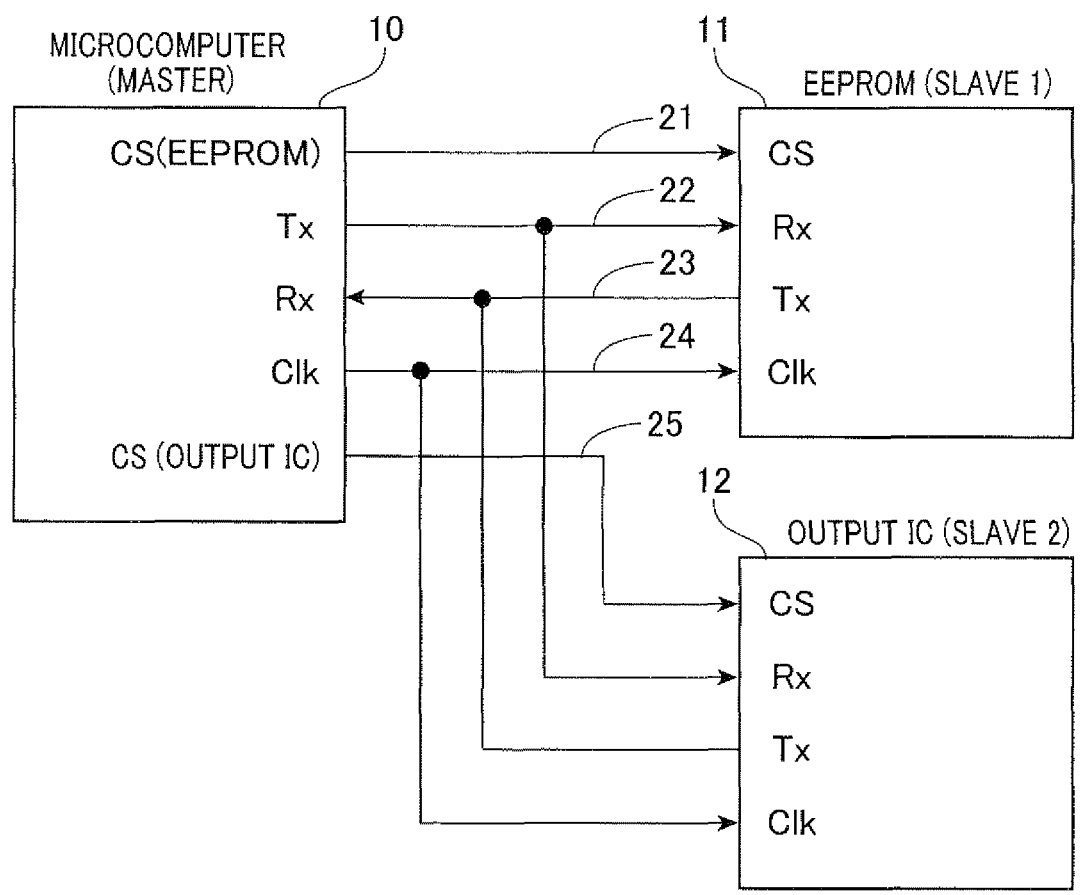
FIG. 10 is a block diagram illustrating a clock-synchronous communication system according to a second embodiment of the present invention.
Figure 11:
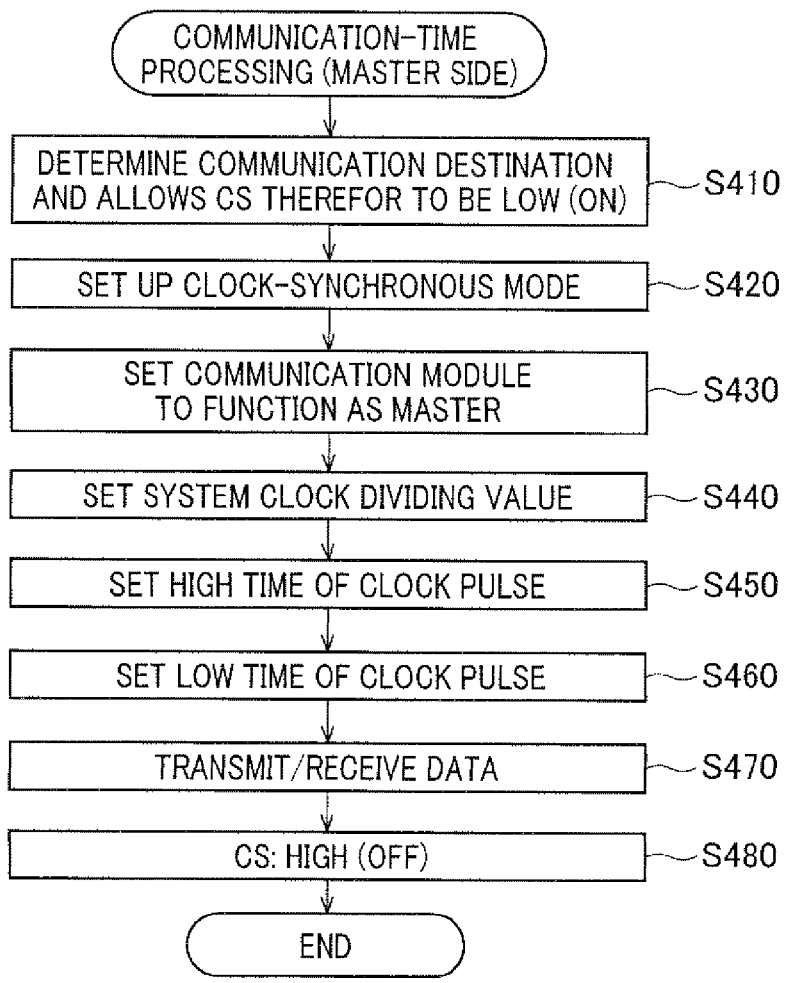
FIG. 11 is a flow diagram illustrating a communication-time processing performed by a microcomputer, according to the second embodiment.

With reference to FIGS. 10 to 11, hereinafter will be described a clock-synchronous communication system according to a second embodiment of the present invention. In the second and the subsequent embodiments, the identical or similar components to those in the first embodiment are given the same reference numerals for the sake of omitting explanation.

The clock-synchronous communication system according to the second embodiment is different from the first embodiment in the following points.

As shown in FIG. 10, the first difference is that, the microcomputer 10 is adapted to communicate with a plurality of slave devices. In this example, in addition to the EEPROM 11, the microcomputer 10 is adapted to communicate with an output IC 12, The output IC 12 is an IC (integrated circuit) that has a function, for example, of measuring time indicated in time information from the microcomputer 10 and outputting a signal after expiration of the time, or of transmitting a value read from a signal inputted from an external unit to the microcomputer 10.

Thus, a chip select line 25 is provided between the microcomputer 10 and the output IC 12, so that the chip select line 25 can be passed with a chip select signal which is outputted from the microcomputer 10 when the output IC 12 is selected as a communication destination. The data signal input terminal Rx of the output IC 12 is connected to the data line 22, the data signal output terminal Tx of the output IC 12 is connected to the data line 23, and the input terminal Clk for clock pulses of the output IC 12 is connected to the clock line 24.

The second difference is that the microcomputer 10 does not perform the startup procedure shown in FIG. 4.

The third difference is that, when communication timing has come when communication should be made with either of the slave devices (either the EEPROM 11 or the output IC 12), the microcomputer 10 performs a communication-time processing shown in FIG. 11.

As shown in FIG. 11, when the microcomputer 10 starts the communication-time processing, the chip select signal (CS) to be transmitted to the communication destination (EEPROM 11 or output IC 12) is allowed to be "low", first, at step S410, to bring the communication destination into a communicable state.

At the subsequent steps S420 to S460, the same processes as in the respective steps S110 to S150 of FIG. 4 described above are performed.

As is apparent from the explanation associated with Formulas (1), (2), (3) and (4), the minimum values of low time TL and high time TH of a clock pulse, which satisfy the two requirements (a) and (b) described above may change depending on the output delay time, the data setup time and the data hold time of the communication destination. Therefore, at steps S450 and S460 corresponding to the steps S140 and S150 of FIG. 4, respectively, high time and low time of a clock pulse are set to the minimum values suitable for the communication destination.

For example, it is assumed that the data setup time of the output IC 12 is 100 µs and the data hold time is 50 µs, and the output IC 12 is the communication destination. With this condition, the value of tb will be 100 µs and the value of tc will be 50 µs in FIG. 8B. Thus, when the communication destination is the output IC 12, the low time TL is set to 150 µs at step S460, and the high time TH is set to 50 µs at step S450.

Then, after finishing the processes at steps S420 to S460, data is transmitted/received, at the subsequent step S460, to/from the communication destination. Then, when data transmission/reception has all been finished, the chip select signal (CS) of the communication destination is allowed to be "high" again instead of "low", at step S480. Thus, the communication-time processing is ended.

As described above, according to the microcomputer 10 of the second embodiment, the high time and low time of a clock pulse are ensured to be switched to the minimum value that satisfies the two requirements (a) and (b), according to the communication destination. Thus, a communication baud rate can be set such that the cycle of a clock pulse will be shortened as much as possible and will be suitable for the communication destination concerned.

[Third Embodiment]

Figure 12:
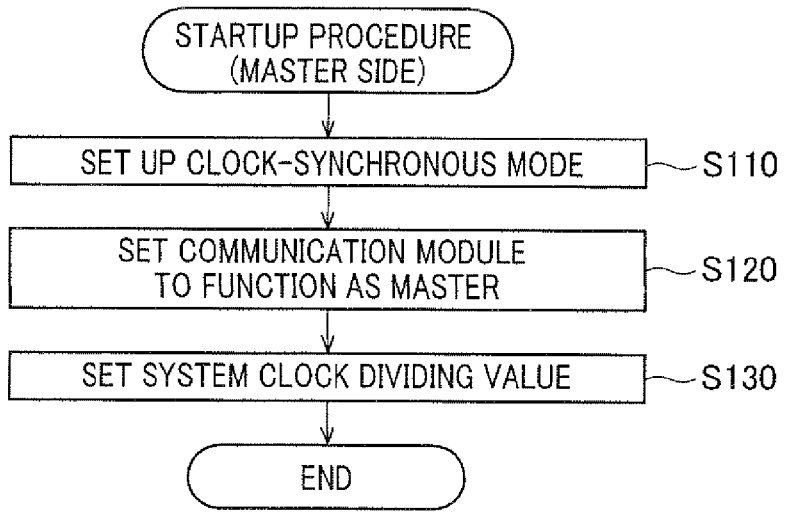
FIG. 12 is a flow diagram illustrating a startup procedure performed by a microcomputer according to a third embodiment of the present invention.
Figure 13:
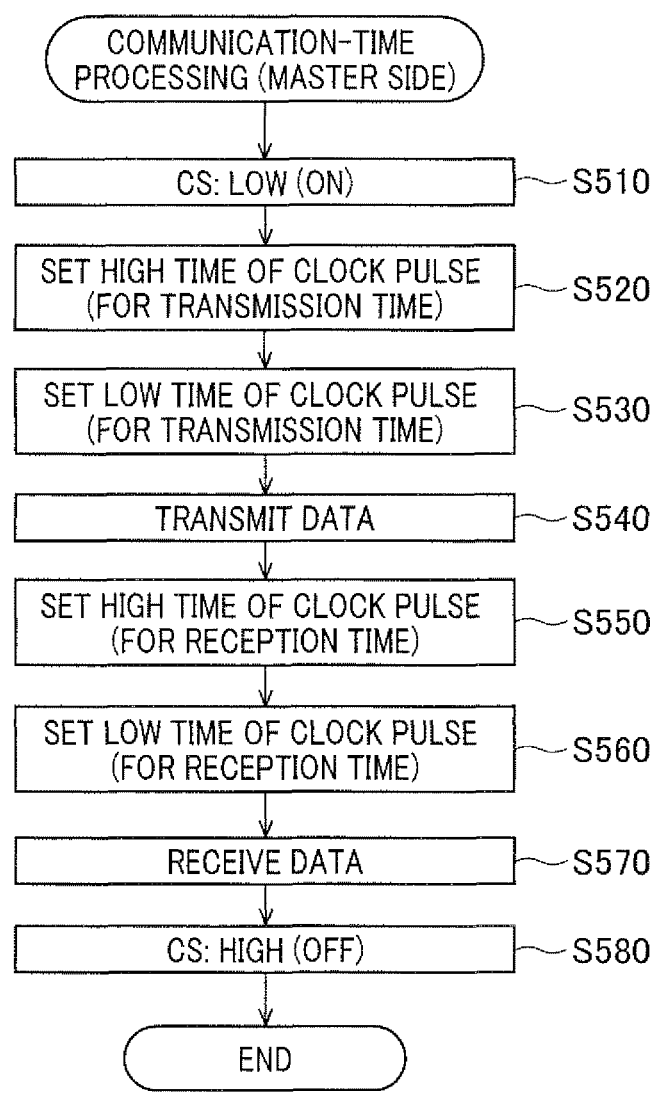
FIG. 13 is a flow diagram illustrating a communication-time processing performed by the microcomputer according to the third embodiment.
Figure 14:
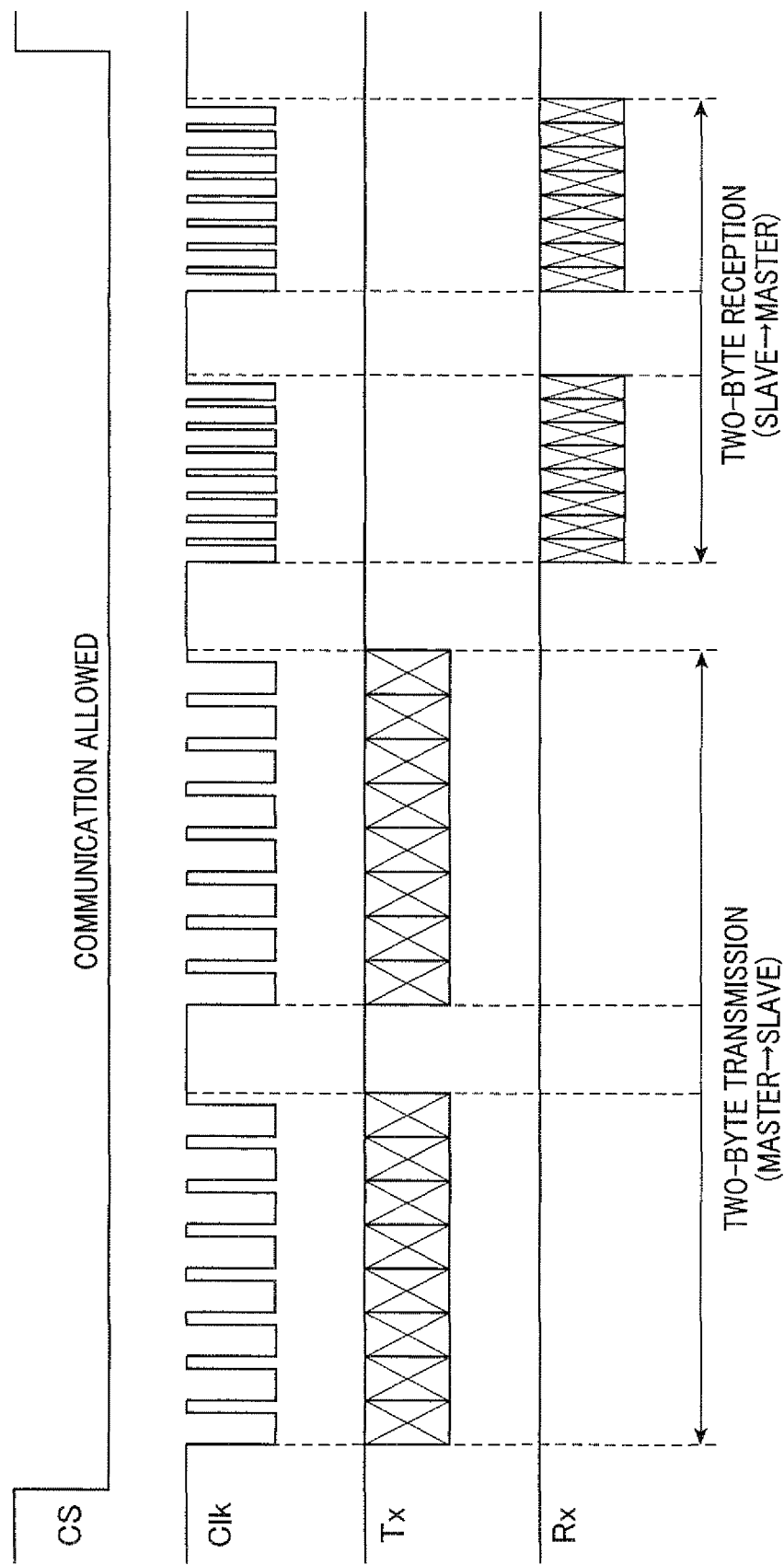
FIG. 14 is a timing diagram illustrating the effect exerted by the third embodiment.

With reference to FIGS. 12 to 14, hereinafter will be described a clock-synchronous communication system according to a third embodiment of the present invention.

A clock-synchronous communication system according to a third embodiment is different from the first embodiment in the following points.

The first difference is that, the microcomputer 10 performs a startup procedure shown in FIG. 12, instead of the startup procedure shown in FIG. 4. The startup procedure of FIG. 12 equals to the one shown in FIG. 4 except that steps S140 and S150 are omitted.

The second difference is that the microcomputer 10 performs a communication-time processing shown in FIG. 13, instead of the communication-time processing shown in FIG. 6.

As shown in FIG. 13, when the microcomputer 10 starts the communication-time processing, the chip select signal (CS) to be transmitted to the EEPROM 11, i.e., the communication destination, is allowed to be "low", first, at step S510, to bring the EEPROM 11 into a communicable state.

Then, at step S520, the high time of the clock pulse is set to a value suitable for transmission time (transmission-time value). At the subsequent step S530, low time of the clock pulse is set to a transmission-time value. Then, at the subsequent step S540, data is transmitted to the EEPROM 11. In other words, the communication module 34 is permitted to transmit data to the EEPROM 11. Then, the communication module 34 transmits data signals corresponding to one bit to the data line 22 every time falling edge (transmission edge) occurs in a clock pulse.

As far as only the transmission from the microcomputer 10 to the EEPROM 11 is concerned, high time and low time suitable for transmission time to be set at steps S520 and S530 are the minimum values that can satisfy the two requirements (a) and (b) discussed above, or are the minimum values that can satisfy Formulas (1) and (2). Accordingly, the low time TL will be 200 μs and the high time HT will be 100 μs.

When the data transmission (corresponding to two bytes) to the EEPROM 11 has all been finished, the high time of a clock pulse is set to a value suitable for reception time (reception-time value), at step S550. At the subsequent step S560, low time of a clock pulse is set to a reception-time value. At the subsequent step S570, data from the EEPROM 11 is received. In other words, the communication module 34 is permitted to receive data from the EEPROM 11. The communication module 34 then reads data signals corresponding to one bit from the data line 23 every time rising edge (reception edge) occurs in a clock pulse.

As far as only the transmission from the EEPROM 11 to the microcomputer 10 is concerned, high time and low time suitable for reception time to be set at the steps S550 and S560 are the minimum values that can satisfy the two requirements (a) and (b) discussed above, or are the minimum values that can satisfy Formulas (3) and (4). Accordingly, the low time IL will be 130 μs and the high time HT will be 40 μs.

When the data reception (corresponding to two bytes) from the EEPROM 11 has all been finished, the chip select signal (CS) to be transmitted to the EEPROM 11 is allowed to be "high" again instead of "low" at the subsequent step S580, whereby the communication-time processing is ended.

As described above, the microcomputer 10 according to the third embodiment is adapted to switch high time and low time of a clock pulse, between the case where data signals are transmitted and the case where the data signals are received. Therefore, as shown in FIG. 14, the communication baud rate during data reception can be set so as to enable much faster communication, compared with the first embodiment (see FIG. 7).

[Fourth Embodiment]

Figure 15:
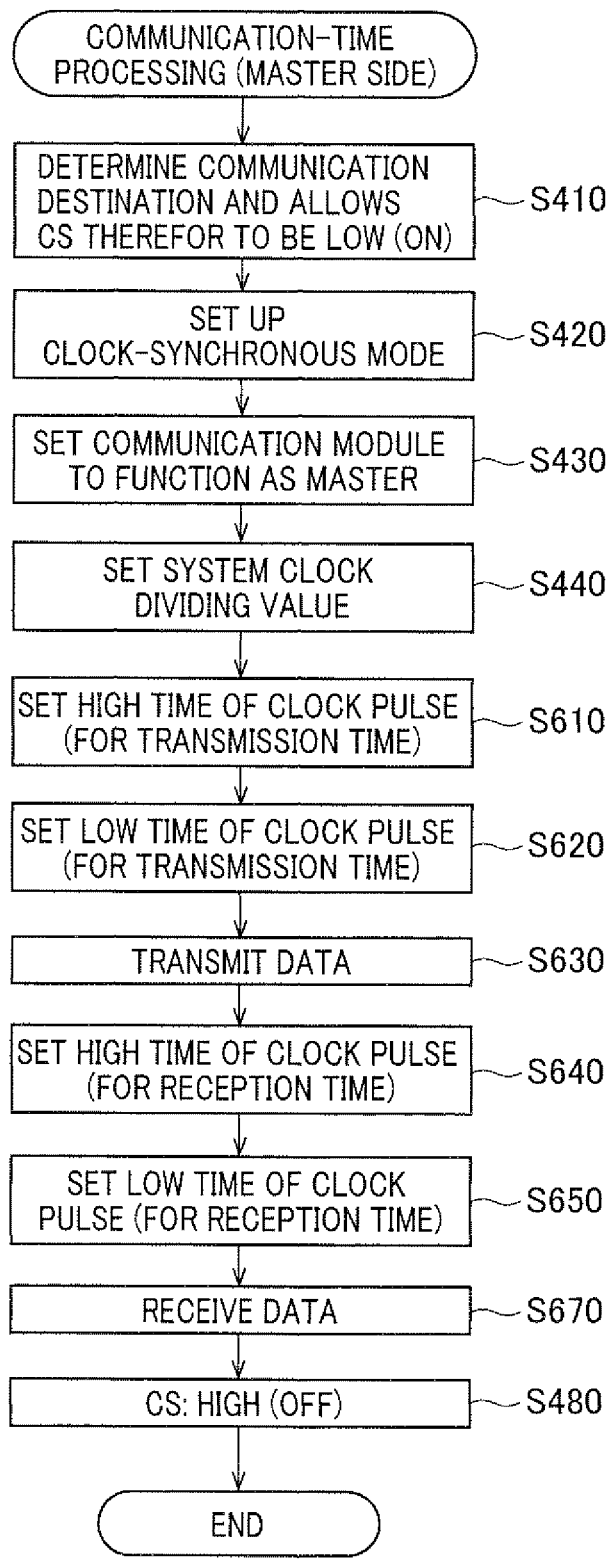
FIG. 15 is a flow diagram illustrating a communication-time processing performed by a microcomputer according to a fourth embodiment of the present invention.

With reference to FIG. 15, hereinafter will be described a clock-synchronous communication system according to a fourth embodiment of the present invention.

A clock-synchronous communication system according to a fourth embodiment will be described. A clock-synchronous communication system according to the forth embodiment is a combination of the second and the third embodiments. Compared with the second embodiment, the fourth embodiment is different in the following points.

When the communication timing has come when communication should be made with either one of the slave devices (either the EEPROM 11 or the output IC 12), the microcomputer 10 performs a communication-time processing of FIG. 15 instead of the communication-time processing of FIG. 11.

The communication-time processing of FIG. 15 equals to that of FIG. 11 except that, in the former, steps S610 to S670 are performed, instead of steps S450 to S470 of the latter.

Specifically, at step S610 subsequent to step S440, high time of a clock pulse is set to a transmission-time value suitable for the communication destination concerned. At the subsequent step S620, the low time of the clock pulse is set to a transmission-time value suitable for the communication destination concerned. Then, at the subsequent step S630, data is transmitted to the communication destination.

As far as only the transmission from the microcomputer 10 to the communication destination is concerned, high time and low time suitable for transmission time to be set at steps S610 and S620 are the minimum values that can satisfy the two requirements (a) and (b) discussed above.

Therefore, when the communication destination is the EEPROM 11, the low time IL will be 200 μs and the high time TH will be 100 μs as calculated from Formulas (1) and (2) set forth above (see the second stage of FIG. 8B).

For example, when the communication destination is the output IC 12, and the output IC 12 has an output delay time, data setup time and data hold time of 70 μs, 100 μs and 50 μs, respectively, the value of tb will be 100 μs, and the value of tc will be 50 μs at the second stage of FIG. 8B. Accordingly, the low time IL will be 150 μs and the high time TH will be 50 μs.

After completing data transmission to the communication destination, high time of a clock pulse is set, at step S640, to a reception-time value suitable for the communication destination. At the subsequent step S650, low time of the clock pulse is set to a reception-time value suitable for the communication destination. Then, at the subsequent step S670, data is received from the communication destination.

As far as transmission from the communication destination to the microcomputer 10 is concerned, suitable high and low times for setting the reception time at steps S640 and S650 are the minimum values satisfying the two requirements (a) and (b) discussed above.

Therefore, when the communication destination is the EEPROM 11, the low time TL will be 130 μs and the high time TH will be 40 μs as calculated from Formulas (3) and (4) set forth above (see the third stage of FIG. 8B).

For example, when the communication destination is the output IC 12, and the output IC 12 has an output delay time, data setup time and data hold time of 70 μs, 100 μs and 50 μs, respectively, the value of to will be 70 μs at the third stage of FIG. 8B. Accordingly, the low time TL will be 100 μs (=70 μs+30 μs) and the high time TH will be 40 μs.

When data reception from the communication destination is finished, control proceeds to step S480 where the chip select signal (CS) to be transmitted to the communication destination is allowed to be "high" again instead of "low".

According to the microcomputer of the fourth embodiment described above, both effects of the second and third embodiments can be exerted. Thus, the communication baud rate can be set so as to enable more effective and faster communication.

[Modification 1]

In the microcomputer 10 in each of the embodiments described above, high time and low time of a clock pulse can each be directly and separately set by the high time register 41 and the low time register 40. However, the configuration with which high time and low time can be separately set is not limited to this.

For example, the following configuration may be used.

Replacing one of the high time register 41 and the low time register 40 (high time register 41 here), a cycle register may be provided so that a value indicative of one cycle of a clock pulse can be set thereto by the CPU 31.

Then, when the value of the counter 36 has matched the value of the low time register 40, the clock pulse output section 38 inverts the output level of clock pulse from "low" to "high". After that, when the value of the counter 36 has matched the value of the cycle register, the clock pulse output section 38 inverts the output level of clock pulse from "high" to "low", and at the same time, may reset the value of the counter 36 to zero. The above operations may be ensured to be repeatedly performed in the configuration.

With this configuration, low time can be changed according to the value of the low time register 40, and high time can be changed according to the value of the cycle register.

[Modification 2]

The following configuration may also be usable as the configuration with which high time and low time of a clock pulse can be separately set.

Replacing one of the high time register 41 and the low time register 40 (high time register 41 here), a cycle register may be provided so that a value indicative of one cycle of a clock pulse can be set thereto by the CPU 31.

The counter 36 may be ensured to function as a downwards counter that decrements count based on divided clocks.

The clock pulse output section 38 may preset a value of the cycle register to the counter 36. Then, when the value of the counter 36 has been decremented by the value corresponding to that of the low time register 40, the clock pulse output section 38 may invert the output level of clock pulse from "low" to "high". After that, when the value of the counter 36 has become "0", the clock pulse output section 38 may invert the output level of clock pulse from "high" to "low", and at the same time, may preset a value of the cycle register to the counter 36. The above operations may be ensured to be repeatedly performed in the configuration.

With this configuration as well, low time can be changed according to the value of the low time register 40, and high time can be changed according to the value of the cycle register.

In the case where Modification 1 or 2 is used, step S140 of FIG. 4, step S450 of FIG. 11, steps S520 and S550 of FIG. 13 and steps S610 and S640 of FIG. 15, at which a value is set to the high time register 41, may be replaced by a step of setting a value indicative of a cycle to the cycle register.

[Modification 3]

For example, in the case where the type of data exchanged between the microcomputer 10 and a slave device is predetermined, the microcomputer 10 and the slave may be configured to simultaneously and parallelly perform communication, i.e., to perform two-way communication. To take FIG. 7 as an example, data in such a mode is simultaneously passed through the signal output terminal Tx (data line 22) and the signal input terminal Rx (data line 23).

However, the third and fourth embodiments in which the combination of high time and low time of clock pulse is changed between transmission time and reception time are not applicable to this mode.

[Modification 4]

Figure 16:
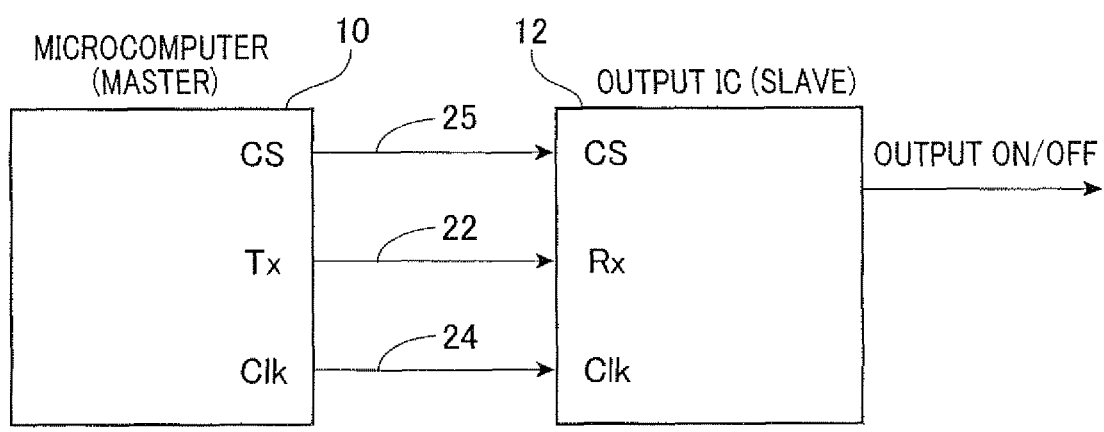
FIG. 16 is a block diagram illustrating a clock-synchronous communication system according to a modification.

As shown in FIG. 16, the microcomputer 10 may perform one-way communication with a slave device. The example shown in FIG. 16 represents the case where one-way communication is performed from the microcomputer 10 to the output IC 12. Accordingly, the output IC 12 shown in FIG. 16 does not have a function of transmitting information to the microcomputer 10, but only has a function of outputting signals in response to the information transmitted from the microcomputer 10.

Some embodiments of the present invention have so far been described. However, the present invention is not intended to be limited to these embodiments, but, as a matter of course, may be implemented in various modes within a scope not departing from the spirit of the present invention.

For example, the slave device that is the communication destination of the microcomputer 10 may not be limited to the EEPROM 11 or the output IC 12, but may be other devices.

Also, the communication apparatus of the present invention may not be limited to a microcomputer, but may, for example, be an ASIC (application-specific integrated circuit) consisting of a logic circuit, or may be a unit consisting of a plurality of electronic components.

The high time and low time of a clock pulse may not necessarily be configured to be programmably variable. For example, it may be so configured that each of low time and high time is changed and set using a jumper cable connected to a unit outside the communication apparatus, or using a DIP (dual in-line package) switch.

In a master device and a slave device (e.g. LSIs, such as microcomputer 10, EEPROM 11 and output IC 12) of this type of clock-synchronous communication system, the output delay time, data setup time and the data hold time may be varied in response to the change in the ambient temperature. Therefore, the communication apparatus as a master device may be configured so that high time and low time of a clock pulse can be corrected according to the change in the ambient temperature.

What is claimed is:

1. A communication apparatus including a master device and a slave device mounted on a communication system, wherein the master device and the slave device are mutually communicable via a data line through which data is transmitted/received and a clock line through which a communication clock having a first edge and a second edge that subsequently occurs to the first edge is transmitted/received, a sender that is either a master device or slave device transmits data to the data line at a first edge timing synchronizing to the first edge, and a receiver that is either a master device or slave device receives data from the data line at a second edge timing synchronizing to the second edge, the communication apparatus used as the master device comprising:

clock outputting means for outputting the communication clock to the slave device via the clock line;

data transmitting means for transmitting the data to the data line in a transmitting period;

data receiving means for receiving the data from the data line in a receiving period being different from the transmitting period; and setting means for dynamically setting a first period that is from the first edge to the second edge and a second period that is from the second edge to the first edge, and setting a period of the communication clock, the first period and the second period being set individually; wherein the setting means is adapted to set the first period $tA+tb$, the second period $tc$, and the period of communication clock $tA+tb+tc$, during the transmitting period when the communication apparatus is the sender, and to set the first period $ta+tB$, the second period $tC$, and the period of communication clock $ta+tB+tC$, during the receiving period when the communication apparatus is the receiver, where $tA$ represents an output delay time of the communication apparatus when the communication apparatus is the sender, the output delay time being defined as a period between a time when the communication apparatus starts to transmit data to the data line at the first edge timing and a time when voltage of the data line reaches a predetermined voltage level corresponding to the transmitted data, $ta$ represents the output delay time of the slave device when the slave device is the sender, $tB$ represents a data setup time of the communication apparatus when the communication apparatus is the receiver, the data setup time being defined as a minimum time during which the sender has to define data on the data line, preceding the second edge of the communication clock, $tb$ represents the data setup time of the slave device when the slave device is the receiver, $tC$ represents a hold time of the communication apparatus when the communication apparatus is the receiver, the hold time being defined as a minimum time during which the sender has to continue outputting of the data to the data line even after the occurrence of the second edge in the communication clock, and $tc$ represents the hold time of the slave device when the slave device is the receiver.

2. The communication apparatus according to claim 1, wherein the communication apparatus is capable of communicating with a plurality of slave devices, and the setting means is adapted to set the first period and the second period each corresponding to the respective slave devices.

\* \* \* \* \*